United States Patent
Peled et al.

(10) Patent No.: US 9,606,802 B2
(45) Date of Patent: Mar. 28, 2017

(54) PROCESSOR SYSTEM WITH PREDICATE REGISTER, COMPUTER SYSTEM, METHOD FOR MANAGING PREDICATES AND COMPUTER PROGRAM PRODUCT

(75) Inventors: Yuval Peled, Kiryat Ono (IL); Itzhak Barak, Kadima (IL); Uri Dayan, Hertzelia (IL); Amir Kleen, Hertzelia (IL); Idan Rozenberg, Raanana (IL)

(73) Assignee: NXP USA, INC., Austin, TX (US)

( * ) Notice: Subject to any disclaimer, the term of this patent is extended or adjusted under 35 U.S.C. 154(b) by 393 days.

(21) Appl. No.: 14/006,034

(22) PCT Filed: Mar. 25, 2011

(86) PCT No.: PCT/IB2011/051285
§ 371 (c)(1),
(2), (4) Date: Sep. 18, 2013

(87) PCT Pub. No.: WO2012/131426
PCT Pub. Date: Oct. 4, 2012

(65) Prior Publication Data
US 2014/0013087 A1    Jan. 9, 2014

(51) Int. Cl.
*G06F 9/44* (2006.01)
*G06F 9/315* (2006.01)
*G06F 9/30* (2006.01)

(52) U.S. Cl.
CPC ........ *G06F 9/30181* (2013.01); *G06F 9/3013* (2013.01); *G06F 9/30018* (2013.01); *G06F 9/30032* (2013.01); *G06F 9/30043* (2013.01); *G06F 9/30072* (2013.01); *G06F 9/30116* (2013.01)

(58) Field of Classification Search
CPC ............... G06F 9/3851; G06F 9/30043; G06F 9/30181; G06F 9/30018; G06F 9/30032; G06F 9/30072; G06F 9/30116; G06F 9/3013
USPC ......................................... 712/220, 225, 228
See application file for complete search history.

(56) References Cited

U.S. PATENT DOCUMENTS

| | | | |
|---|---|---|---|
| 5,737,625 A * | 4/1998 | Jaggar | 712/41 |
| 5,859,999 A | 1/1999 | Morris et al. | |
| 5,948,099 A * | 9/1999 | Crawford et al. | 712/225 |
| 6,175,892 B1 | 1/2001 | Sazzad et al. | |
| 6,282,631 B1 * | 8/2001 | Arbel | 712/35 |
| 6,804,771 B1 | 10/2004 | Jung et al. | |
| 7,092,526 B2 * | 8/2006 | Lee | 380/37 |

(Continued)

FOREIGN PATENT DOCUMENTS

CN    1839372 A    9/2006

OTHER PUBLICATIONS

International Search Report and Written Opinion correlating to PCT/IB2011/051285 dated Dec. 27, 2011.

*Primary Examiner* — Daniel Pan

(57) ABSTRACT

A processor system is adapted to carry out a predicate swap instruction of an instruction set to swap, via a data pathway, predicate data in a first predicate data location of a predicate register with data in a corresponding additional predicate data location of a first additional predicate data container and to swap, via a data pathway, predicate data in a second predicate storage location of the predicate register with data in a corresponding additional predicate data location in a second additional predicate data container.

18 Claims, 3 Drawing Sheets

(56) References Cited

U.S. PATENT DOCUMENTS

| | | | |
|---|---|---|---|
| 7,185,150 B1 * | 2/2007 | Kogge | 711/147 |
| 7,194,606 B2 * | 3/2007 | Bhushan et al. | 712/226 |
| 2003/0135713 A1 | 7/2003 | Rychlik et al. | |
| 2004/0088526 A1 | 5/2004 | Colavin et al. | |
| 2005/0055541 A1 | 3/2005 | Aamodt et al. | |
| 2008/0046683 A1 | 2/2008 | Codrescu et al. | |
| 2008/0082798 A1 | 4/2008 | Bloomfield et al. | |
| 2008/0244238 A1 * | 10/2008 | Mitu | 712/220 |

* cited by examiner

PROCESSOR SYSTEM WITH PREDICATE REGISTER, COMPUTER SYSTEM, METHOD FOR MANAGING PREDICATES AND COMPUTER PROGRAM PRODUCT

FIELD OF THE INVENTION

This invention relates to a processor system with at least one predicate register, a computer system with at least one such processor system, a method for managing predicates and a corresponding computer program product.

BACKGROUND OF THE INVENTION

Many modern central processing unit (CPU) architectures or processor systems of computer systems allow the use of predicates, for example to control conditional execution of certain instructions or conditional jumps, to avoid unnecessary jumps and branching during code execution by the processor system. Correspondingly, compiler programs for software running on such systems may be programmed for extensive use of predicates. Predicates used by the compiler are often not directly mirrored in hardware, as hardware predicate registers for storing predicates and the accompanying logic can be rather expensive. Thus, hardware architectures usually support only a limited number of predicate registers, which require careful managing. The lack of sufficient hardware predicate registers can lead to performance losses during the execution of software. On the other hand, managing hardware predicate registers and mapping software-defined predicates onto them can be a demanding task for a developer or compiler program.

SUMMARY OF THE INVENTION

The present invention provides a processor system with at least one predicate register, a computer system, a method for managing predicates and a computer program product as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION OF THE PREFERRED EMBODIMENTS

Figure 1:
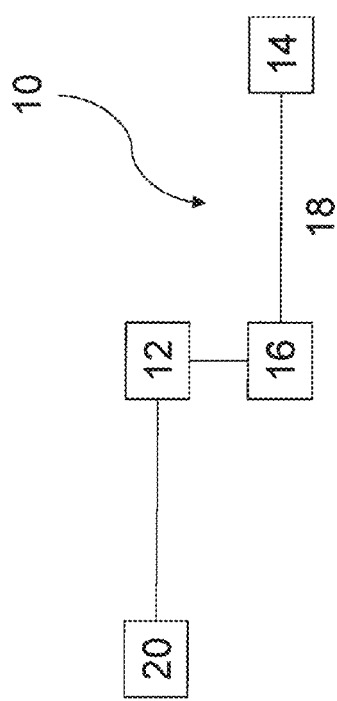
FIG. 1 shows an example for a set-up of a processor system.

Because the illustrated embodiments of the present invention may for the most part, be implemented using electronic components, circuits and software known to those skilled in the art, details will not be explained in any greater extent than that considered necessary as illustrated above, for the understanding and appreciation of the underlying concepts of the present invention and in order not to obfuscate or distract from the teachings of the present invention.

In the context of this description, a processor system may be an electronic device comprising one or more processor units. It may comprise any kind of microprocessor or digital control unit such as a DSP (Digital Signal Processor) or a microcontroller. A processor system or processing unit may be of any kind of known CPU (Central Processing Unit) architecture. For example, it may be ARM-based, x86-based, or based on a Power family architecture. A processor unit may e.g. be or comprise a StarCore processing unit. The processing unit may comprise one or more processor cores. A processing unit may comprise a predefined instruction set. An instruction set may define low-level instructions to be carried out by the processing unit. The instruction set may be defined machine-readable. It may be stored integrally on the processing unit or the processor system. Generally, a processor system may comprise a processing unit and one or more registers. It may be considered that a processor system comprises interfaces to connect it to additional components, for example to fit a processor system onto a mainboard of a computing system. A computing system may comprise one or more processor systems and include memory, like e.g. random access memory (RAM) and/or cache memory and/or peripheral devices or interfaces to peripheral devices like storage devices, e.g. hard discs, and/or a graphic device like a graphics chip or card, etc.

A register may be considered to be a small amount of storage space or memory available to a CPU or processing unit. Its contents may be accessed more quickly and preferred to storage available elsewhere. In particular, it may be considered that a register may be accessed by the processing unit directly during the execution of a program. A register may be implemented on a chip or die of the processing unit. It may be arranged closely to the processing unit. Generally, a register may allow preferred and very fast access. A register in particular may be situated in the processing unit and is usually not considered to be cache memory or RAM. It may be contemplated that a register represents a memory unit directly addressable as a unit by the processing unit. A register set may comprise one more registers. The registers of a register set may be individually and/or directly addressable. It may be considered that a register comprises the memory which is the easiest and fastest to access for a CPU or processing unit.

A predicate register may be a register for storing one or more predicates. A processing unit may be adapted for direct access to a predicate register to perform a conditional execution of an instruction depending on the state of the predicate register or one or more predicates stored in the predicate register. The instruction set of the processing unit may comprise corresponding instructions causing the processor system to perform conditional execution of an operation. It may be considered that conditional execution of an instruction or operation may mean that the instruction or operation is only executed if a corresponding predicate is in a state that allows the execution, for example if a corresponding predicate bit is set.

A general purpose register may be a register available for more general purposes. Data may be read from a general purpose register and written into a predicate register and vice versa. It may be contemplated that a processing unit may not directly access a general purpose register to use it as a predicate register to read and/or check the state of a predicate and directly execute or not an operation based on the state of the general purpose register. A general purpose register may contain an integer multiple of the bits of a predicate register. In particular, a general purpose register may be adapted to contain 3, 4, at least 4, or 5 or more times the number of bits of a predicate register.

A register may comprise data locations adapted to store data. A data location may comprise one bit or a group of bits, for example a nibble, a byte, or a word. A data structure may be defined for a register or parts of a register. A part of a register comprising a one or more bits may be considered to be a data container. A data structure may arrange bits into groups of bits and/or assign meanings, thus defining data locations and/or functions for individual bits and/or groups of bits. For example, a data structure may define that a group of bits represents a character, a number or a pointer and/or that a given bit represents a flag. In particular, a data structure may be defined on a data container comprising one or more data locations. A data structure of a register or data container may be considered to correspond to a data structure of another register or data container, if it comprises the same arrangement of data locations in respect to size and function of data locations defined by the data structure. It may be considered that a data structure comprises different data locations having different numbers of bits and/or different functions. For example, a data structure may comprise a first, a second and a third data location, the first data location being a bit, the second data location being a byte and the third data location being a nibble.

A predicate may be a single bit checked for conditional execution by the processing unit. It may be considered that a predicate comprises one or more bits. Bits of a predicate may be sequential bits in a register, or they may be distributed.

A data pathway between registers may provide a connection for data transmission between the registers. A data pathway generally may be a direct connection or an indirect connection. An indirect connection may run via one or more intermediate components, for example intermediate buffers/registers or an intermediate processing unit.

There may be envisioned a processor system comprising a processing unit with a predetermined instruction set. An example for such a processor system is the processor system 10 shown in FIG. 1 and described in more detail below. The processing unit may be a processing unit 12 as shown in FIG. 1. The processor system may comprise at least one predicate register, e.g. a predicate register 14 of FIG. 1 or predicate register 102 of FIG. 2. It may be considered that the predicate register comprises a number n of predicate data locations, e.g. predicate data location P1, P2, . . . , Pn of FIGS. 1 and 2. The predicate data locations may be arranged in a predicate data structure, each predicate data location being adapted to store predicate data. In particular, the predicate register may comprise n predicate bits.

Figure 2:
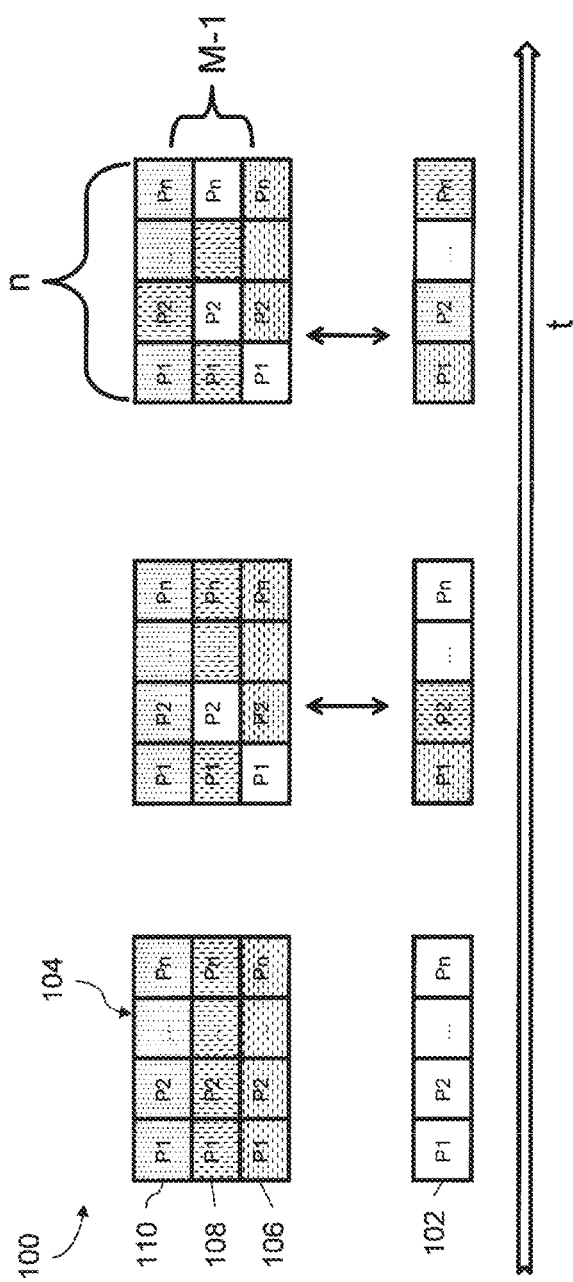
FIG. 2 shows an example of managing predicates.

The processor system may comprise at least one general purpose register, which may be a general purpose register 16 of FIG. 1 or a general purpose register 104 of FIG. 2. The general purpose register may comprise additional predicate data locations, the additional predicate data locations being arranged in a number M−1 of additional predicate data containers. A data structure of each additional predicate data container may correspond to the predicate data structure, wherein each additional predicate data location is adapted to store additional predicate data. Examples of additional predicate data containers or data structures are described in more detail below in particular with reference to FIGS. 2 and 3. Thus, data containers 106, 108, 110 of FIGS. 2 and 3 respectively the corresponding lines may be considered as examples of data containers.

There may be provided a data pathway for transmitting data between the at least one predicate register and the general purpose register, wherein at least one predicate storage location is connected or connectable via the data pathway to at least one corresponding additional predicate data location. An example of such a data pathway is data pathway 18 as shown in FIG. 1.

An additional data location may be considered to correspond to a predicate data location if its size, function and/or arrangement inside the associated data structure corresponds or equals the size, function and/or arrangement of the predicate data location inside the predicate register data structure.

The processor system may be adapted to carry out a predicate swap instruction of the instruction set to swap, via the data pathway, predicate data in a first predicate data location with data in a corresponding additional predicate data location in a first additional predicate data container and to swap, via the data pathway, predicate data in a second predicate storage location with data in a corresponding additional predicate data location in a second set of additional predicate data. The swap instruction may be exemplified by a swap instruction described below in particular with reference to FIG. 3.

Predicate data in the predicate register may be considered to be active predicate data, as it may be used for conditional execution of operations. Data stored in the general purpose register as additional predicate data may be envisioned to be non-active predicate data. Non-active data may become active by swapping it into a data location of the predicate register. It may be considered that the general purpose register together with the predicate register define a matrix of size n×M, with n×M data locations for storing predicate data or additional predicate data.

Each predicate data location of the predicate register may be associated to M−1 data locations of the general purpose register. Swapping of data may be performed without intermediate buffering or storing of data to be swapped. The predicate swap instruction may be defined to swap predicate data from more than two predicate storage locations with data from two or more corresponding additional predicate data locations. It may be considered that the predicate swap instruction may be part of the instruction set of the processing unit.

Each predicate storage location may be adapted to store one or more than one predicate bit. The predicate data storage locations may have equal sizes in terms of bits, e.g. they may be a single bit each. It is feasible that the processor system is further adapted to carry out the predicate swap instructions within one clock cycle of the processing unit. A single instruction causing the swapping of predicate data may be defined. An example of such a single instruction is described more detailed below with reference to FIG. 3.

The processor system may comprise more than one general purpose register comprising additional predicate data locations. It may be envisioned that more than one general purpose register is addressable by the predicate swap instruction. The processor system may comprise more than one predicate register. The predicate registers may be arranged as a set of predicate registers. More than one predicate register may be addressable by the predicate swap instruction. In particular, it may be envisioned that all predicate registers are addressable by the predicate swap instruction. Each predicate data location may be connected or connectable via the data pathway to at least one corresponding additional predicate data location of one or more general purpose registers. It may be envisioned that each additional predicate data location is connected or connectable via the data pathway to the corresponding predicate data location. A computer system comprising a processor system as described herein may be contemplated.

There may be envisioned a method of managing predicate data of a processor system, in particular a processor system as described herein. Examples of the method are explained below in particular with reference to FIGS. 2 and 3. The method may comprise identifying a predicate swap instruction, which may be a swap instruction as described below in the context of FIGS. 2 and 3. It may be envisioned to perform storing data regarding the origin of swapped data and/or the target of swapped data in a memory. The method may be carried out by a compiler. The compiler may perform the method during compiling software and using one or more predicates. The compiler may assign memory, e.g. RAM and/or cache memory, to store the data regarding the origin and/or target of swapped data. This data may allow reconstruction, at any time, of which data is active and where active and non-active data is stored in the general register.

There may be considered a computer program product stored on a computer readable memory, the computer program product comprising instructions causing a computer system, in particular a computer system as described herein, to perform this method.

Now referring in more details to the figures, FIG. 1 shows a general overview of a processor system 10. The processor system 10 may comprise peripheral devices (not shown for the sake of simplicity). The processor system 10 may comprise a processing unit 12. The processing unit 12 may for example be implemented in a StarCore architecture. It may comprise one or more processor cores. Depending on the architecture of the processing unit 12, an instruction set comprising predetermined instructions may be defined for the processing unit. The processing unit 12 may be arranged to be capable of carrying out the instructions of the instruction set.

Associated to the processing unit 12 may be a set of predicate registers 14. The set of predicate registers 14 may comprise one or more predicate registers. Each predicate register 14 may store one or more predicates as predicate data, which may represent conditions for the conditional execution of instructions. A predicate may be stored in a predicate data location. A data structure may be defined for each of the predicate registers 14. The processing unit 12 may check whether a predicate bit is set to 1, and only if that is the case, executes a given instruction defined to be conditional on the corresponding predicate.

A set of general purpose registers 16 may be associated to the processing unit 12. The set of general purpose registers 16 may comprise one or more individually addressable general purpose registers. The size of at least one register of the set of general purpose registers 16 may be larger than the size of the predicate register set 12.

The instruction set may comprise one or more instructions causing the processing unit 12 to save data from a predicate register to a general purpose register, and/or read data from a general purpose register into a predicate register. Each predicate register may be connected or connectable to one or more general purpose registers. Each predicate register may be connected or connectable to each general purpose register. It should be noted that both the general purpose register 16 and/or the predicate register 14 may be directly or indirectly connected or connectable to the processing unit 12. The processing unit 12 may be connected to a memory arrangement 20, which may comprise cache memory and/or RAM.

There may be provided a data pathway 18 between the set of predicate registers 14 and the set of general purpose registers 16. The data pathway 18 may provide a direct connection between the set of predicate registers 14 and the set of general purpose registers 16 or at least one predicate register and one general purpose register, without intermediate registers and/or without an intermediary function of the processing unit 12. The data pathway 18 may be arranged such that each bit of a predicate register is connected or connectable to one or more bits of a general purpose register. For example, a bit numbered 3 of a first predicate register may be connected or connectable to bit numbered 3 of a first general purpose register, a second general purpose register and/or a third general purpose register. Each bit of the predicate register may be connected or connectable to corresponding bits in data containers of the one or more general purpose registers corresponding to the predicate register or its data structure, respectively.

If the size in bits of the general purpose registers is larger than a size of a predicate register, each bit of a predicate register may e.g. be connected or connectable to more than one bit inside the general purpose register. For example, assuming that the size of a predicate register is 16 bit and the size of a general purpose register is 32 bit, bit number 3 of the predicate register may be connected or connectable to bit number 3 and/or bit number 19 of a general purpose register.

FIG. 2 shows an arrangement of registers in different stages of an example of a method of managing predicates. As shown, the arrangement comprises one or more predicate registers 102. Each predicate register 102 may comprise one or more predicate locations to store predicates. In the example shown in FIG. 2, there is shown a predicate register 102 comprising n predicates P1, P2, . . . , Pn. Each predicate may be represented by a bit or by a bit sequence. As shown in FIG. 2, the arrangement may comprise a general purpose register 104. The general purpose register 104 may be arranged to store M−1 sets of additional predicates. Each set of additional predicates may have the same length or number of bits n as the predicate register 102. For this purpose, the general purpose register 104 may comprise a number of data containers 106, 108, 110, three of which are shown in FIG. 2, each data container representing a set of additional predicates.

Each data container 106, 108, 110 may have a data structure corresponding to the data structure of the predicate register.

A data container 106, 108, 110 may be represented as a line of data locations, the lines of the general purpose register 104 being arranged as shown in FIG. 2. The general purpose register 104 and the predicate register may provide n×M data locations, M−1 being the number of data containers or lines in the general purpose register 104 corresponding to the predicate register or its data structure. It should be noted that data blocks originally stored in the predicate register 102 are shown in FIG. 2 with white background. Data stored originally in line 106 is marked with horizontal stripes. Data originally stored in line 108 is marked with vertical stripes. Data originally stored in line 110 is marked with dots. As may be seen, in this example, the additional predicate data stored in a general purpose register 104 are arranged similar to the predicate in the predicate register 102. There may be provided a data path connecting the locations P1, . . . , Pn of predicate register 102 with their corresponding locations P1, . . . , Pn of general purpose register 104. Thus, location P1 of predicate register 102 may be connected to the three locations P1 of general purpose register 104, P2 may be connected or connectable to the locations P2 of general purpose register 104, etc. At the bottom of FIG. 2, there is shown a time arrow t corresponding to a program flow. During the flow of the program in the direction indicated with the time arrow, data stored in predicate data locations in predicate register 102 may be swapped with data in predicate locations in the general purpose register 104. At the beginning of the time development shown at the left hand side in FIG. 2, the data in the data locations of registers 102, 104 corresponds to its original state. With advancing time, shown in the middle representation of FIG. 2, a predicate swap command may be executed, causing data in one or more locations of predicate register 102 to be swapped with data in one or more locations of general purpose register 104. The swap may be caused by a single instruction. More particular, a single instruction of the instruction set of the processing unit can cause swapping data between the predicate register 102 and the general purpose register 104, which may be identified as target register for the swap instruction.

In the example shown in the middle view of FIG. 2, the data stored in location P1 of predicate register 102 is swapped with data stored in the first line 106 of general purpose register 104. In parallel with that, with the same instruction, data stored in location P2 of predicate register 102 is swapped with data in location P2 of the second line 108 of general purpose register 104. The different lines in the general purpose register 104 may be directly addressed by the same instruction, as they belong to the same general purpose register.

A compiler or interpreter for a program may be arranged to provide measures to keep track of where data currently in predicate register 102 originated from. In particular, the compiler may have defined command structures and data structures, e.g. in RAM, for a compiled program such that when the compiled program is running, it keeps track of how data is distributed in the set of registers 102, 104.

The compiler, during compilation, may adapt the program such that the relevant predicate data is stored in predicate data locations during execution of the program to be compiled without a table of data locations being provided by the compiled program. In the right hand side of FIG. 2, there is shown a further swapping of data of predicate locations. In this swapping, the data currently in location P2 of predicate register 102, which originated from the second line of general purpose register 104, may be swapped with data in the third line 110 of the general purpose register 104. Data in location Pn of the predicate register 102, which in this case before the swapping is still the original predicate data, may be swapped with predicate data in location Pn of the third line 110 of general purpose register 104. Thus, after the swapping, predicate register 102 may contain in its first location P1 predicate data originating from location P1 of the first line 106 of general purpose register 104. In location P2, there may be stored data originating from location P2 of the third line 110 of the general purpose register 104. In this example, data in locations P3, . . . , Pn−1 of the predicate register 102 is not changed during the shown execution of the program. In location Pn of predicate register 102, there may be stored data originating from the second line 108 of the general purpose register 108 as originally set up. As can be seen, the general purpose register 104 and the predicate register 102 together provide a n×M-matrix of predicate data, where M designates the lines of this predicate data matrix and n represents the number of predicates in each line (or the rows of the matrix). In the predicate register 102, active predicates may be stored, which the processing unit may directly access for conditional execution of commands. In the general purpose register, n×M−1 non-active predicates may be saved. In addition to the swap instruction shown, there may be defined further transactions like save and/or restore to respectively save data from a location in the predicate register 102 into a location of a general purpose register or to restore or load data from a location in the general purpose register 104 into the predicate register 102. More than one general purpose register may be provided, so that the corresponding instructions may address the general purpose register. M may be 2, 3, 4, 5 or larger.

Figure 3:
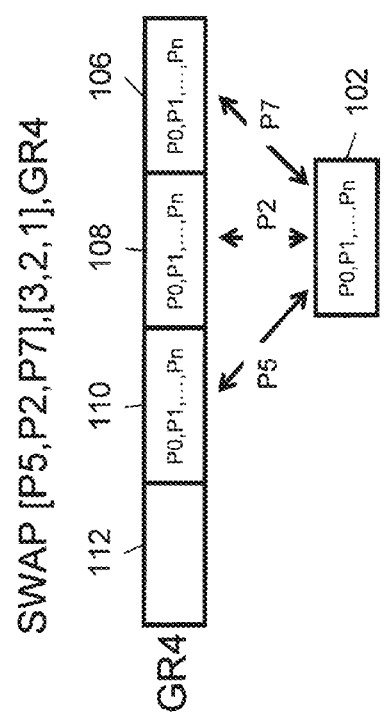
FIG. 3 describes an implementation of a predicate swap instruction.

In FIG. 3, there is shown an example for an instruction for swapping predicate data. It may be assumed that there are provided several general purpose registers GR1, . . . , GRL, of which GR4 is shown. A predicate register 102 may comprise a given number of predicate locations P1, . . . , Pn. In particular, it may be considered that predicate register 102 contains a thus defined single line of predicate data. General purpose register GR4 may comprise several lines of data locations for storing predicate data, wherein a line may be interpreted as data container corresponding to a predicate register. In particular, it may comprise a first line 106, a second line 108, a third line 110 and fourth line 112. A line may be defined as a data structure being able to store data structured as the data stored in the predicate register 102. It should be noted that the arrangement of data locations of general purpose register 104 may be represented as a continuing line as shown in FIG. 3, or as a more matrix-like structure as shown on FIG. 2 and that it is clear for a person skilled in the art how to address such data structures independent of the graphic representation.

An instruction for swapping data between predicate register 102 and a general purpose register like general purpose register GR4 may be represented in pseudo-code as $$\text{SWAP [P5,P2,P7],[3,2,1],GR4.} \qquad (1)$$

This instruction instructs a processing unit to access general purpose register GR4 and to exchange data stored at location P5 of predicate register 102 with data stored at location P5 in the third line of register GR4, represented by the number 3. Data at location P2 of predicate register 102 is to be swapped with data at location P2 in the second line of general purpose register, represented by the number 2. Data stored in location P7 of predicate register 102 is to be swapped with data stored at location P7 in the first line of general purpose register GR4. Generally, the instruction may require a first parameter list indicating which data locations of the predicate register to swap, in the example [P5, P2, P7]. There may be a second parameter or parameter list indicating which general purpose register is addressed as target of the swap instruction, e.g. GR4. A third parameter list may indicate which data container corresponding to the predicate register within the general purpose register the swaps are to be performed with, e.g. [3, 2, 1]. A further parameter may be used to indicate which predicate register is the basis for swapping. The first and third parameter list may include an equal number of parameters. The number of parameters for the first and/or third parameter list may be variable between 1 and n (n being an integer). It should be clear for a skilled person that the parameters of the instruction may be arranged in any suitable order. A parameter or parameter list for the instruction may e.g. be stored in a memory, in particular in a register like a general purpose register. The memory or register may be accessed and/or read, e.g. by the processing unit, when executing the instruction. More than one parameter or parameter list for the instruction may be stored and accessed in this way. The instruction may be defined to take as parameter one or more pointers or indicators of which register or memory to access when executing the instruction.

A general purpose register may be saved and/or restored from different memories, for example a cache memory or a RAM memory. Also, a general purpose register may be virtually extended into RAM and/or cache memory and/or a different register. Different general purpose registers can e.g. be connected to represent a single general purpose register for storing additional predicate data. Thus, an essentially infinite number of predicates may be used.

According to the approach presented herein, there may easily provided a large number of predicates on hardware side without having to actually implement all the registers as expensive predicate registers. Rather, there may be provided a field or matrix of n×M data locations for storing predicate data, n of which are stored in a predicate register and may be used actively for conditional execution of operations by the processing unit. M−1×n data locations may store inactive predicate data. Managing and monitoring which predicate data are stored where, and which are to become active at a given stage in a program may be entrusted to a compiler. With a single instruction, the processing unit may be caused to easily exchange predicates during execution of a programme without a large overhead. Thus, an inexpensive method of providing a large amount of predicates from hardware-side is provided, enabling better performance of software.

The invention may be implemented in a computer program or computer program product for running on a computer system, at least including code portions for performing stages of a method according to the invention when run on a programmable apparatus, such as a computer system or enabling a programmable apparatus to perform functions of a device or system according to the invention.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on computer readable storage medium or transmitted to the computer system via a computer readable transmission medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices. The computer system or processor system may be used for any kind of computing device, e.g. a mobile unit with telecommunication capability like a laptop, a smartphone, mobile phone, tablet computer, desktop, workstation and/or a server or mainframe computer.

In the foregoing specification, the invention has been described with reference to specific examples of embodiments of the invention. It will, however, be evident that various modifications and changes may be made therein without departing from the broader spirit and scope of the invention as set forth in the appended claims.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Furthermore, the term "set" is used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality. For example, it may be envisioned that the predicate register and/or the general purpose register are implemented on the processing unit.

Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. For example, the processor system or computer system may be implemented as a system on a chip. Alternatively, the examples may be implemented as any number of separate integrated circuits or separate devices interconnected with each other in a suitable manner. For example, the processing unit and the registers may be implemented separately.

Also for example, the examples, or portions thereof, may be implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an". The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A processor system comprising:
   a processing unit with a predetermined instruction set;
   a predicate register comprising a first plurality of predicate data locations,
   including PL1, PL2, and PL3, each predicate data location being adapted to store predicate data, the first plurality of predicate data locations is an integer number N;
   a general purpose register comprising a second plurality of general purpose data locations, the second plurality of general purpose data locations are configured to be partitioned into sets of general purpose register locations, each set of the M sets having N general purpose data locations;
   a data pathway for transmitting data between the predicate register and the general purpose register; and
   the processor system configured to carry out a predicate swap instruction of the predetermined instruction set to:
   swap, via the data pathway, predicate data at PL1 of the predicate register with data at a corresponding general purpose data location of a first set of the M sets based on a first portion of the predicate swap instruction identifying PL1 and a second portion of the predicate swap instruction identifying the first set of the M sets; and to
   swap, via the data pathway, predicate data at PL2 of the predicate register with data at a corresponding general purpose data location of a second set of the M sets based on a third portion of the predicate swap instruction identifying PL2 and a fourth portion of the predicate swap instruction identifying the second set of the M sets.

2. The processor system according to claim 1, wherein the predicate swap instruction is defined to swap predicate data at more than two predicate data locations of the first plurality of predicate data locations of the predicate register with data at more than two general purpose data locations of the second plurality of general purpose data locations of the general purpose register.

3. The processor system according to claim 1, wherein each predicate data location of the first plurality of predicate data locations of the predicate register stores one predicate bit, and each general purpose data location of the second plurality of general purpose data locations stores one predicate bit.

4. The processor system according to claim 1, wherein the predicate data locations of the first plurality of predicate data locations of the predicate register are equally sized.

5. The processor system according to claim 1, wherein the processor system carries out the predicate swap instruction within one clock cycle of the processing unit.

6. The processor system according to claim 1, wherein the processor system comprises more than one general purpose register comprising the second plurality of general purpose data locations.

7. The processor system according to claim 6, wherein more than one general purpose register is addressable by the predicate swap instruction.

8. The processor system according to claim 1, comprising more than one predicate register.

9. The processor system according to claim 8, wherein more than one predicate register is addressable by the predicate swap instruction.

10. A method, comprising:
    executing, by a processing unit of a processor system, a predicate swap instruction of a predetermined instruction set to perform:
    swapping, by the processing unit, via a data pathway, predicate data at a first predicate data location of a first plurality of predicate data locations of a predicate register with data at a corresponding general purpose data location of a first set of M sets of general purpose register locations of a second plurality of general purpose data locations based on a first portion of the predicate swap instruction identifying the first predicate data location and a second portion of the predicate swap instruction identifying the first set of the M sets; and swapping, by the processing unit, via the data pathway, predicate data at a second predicate data location of the first plurality of predicate data locations with data at a corresponding general purpose data location of a second set of the M sets based on a third portion of the predicate swap instruction identifying the second predicate data location and a fourth portion of the predicate swap instruction identifying the second set of the M sets, wherein the first plurality of predicate data locations is an integer N, and the second plurality of general purpose data locations are configured to be partitioned into the M sets of general purpose register locations, each of the M sets having N general purpose data locations.

11. The method according to claim 10, wherein the predicate swap instruction is defined to swap predicate data at more than two predicate data locations of the first plurality of predicate data locations with data at two or more corresponding general purpose data locations of the second set of the M sets.

12. The method of claim 10, wherein each predicate data location of the first plurality of predicate data locations of the predicate register stores one predicate bit, and each general purpose data location of the second plurality of general purpose data locations stores one predicate bit.

13. The method of claim 10, wherein the predicate data locations of the first plurality of predicate data locations of the predicate register are equally sized.

14. The method of claim 10, wherein the processor system carries out the predicate swap instruction within one clock cycle of the processing unit.

15. The method of claim 10, wherein the processor system comprises more than one general purpose register comprising the second plurality of general purpose data locations.

16. The method of claim 10, wherein more than one general purpose register is addressable by the predicate swap instruction.

17. The method of claim 10, wherein the processor system comprising more than one predicate register.

18. A method, comprising:

executing, by a processing unit of a processor system, a predicate swap instruction of a predetermined instruction set to perform:

swapping, by the processing unit, predicate data at a first predicate data location of a first plurality of predicate data locations of a predicate register with data at a corresponding general purpose data location of a first set of M sets of general purpose register locations of a second plurality of general purpose data locations based on a first portion of the predicate swap instruction identifying the first predicate data location and a second portion of the predicate swap instruction identifying the first set of the M sets; and swapping, by the processing unit, predicate data at a second predicate data location of the first plurality of predicate data locations with data at a corresponding general purpose data location of a second set of the M sets based on a third portion of the predicate swap instruction identifying the second predicate data location and a fourth portion of the predicate swap instruction identifying the second set of the M sets.

* * * * *